United States Patent [19]

Haddock

[11] Patent Number: 4,912,312
[45] Date of Patent: Mar. 27, 1990

[54] OPTICAL CARD DUPLICATING SYSTEM

[75] Inventor: Richard Haddock, Redwood City, Calif.

[73] Assignee: Drexler Technology Corporation, Mountain View, Calif.

[21] Appl. No.: 162,918

[22] Filed: Mar. 2, 1988

Related U.S. Application Data

[63] Continuation-in-part of Ser. No. 937,648, Dec. 2, 1986, Pat. No. 4,820,913.

[51] Int. Cl.$^4$ .................. G06K 1/18; G06K 13/08
[52] U.S. Cl. .................................. 235/487; 235/454; 235/486; 235/475; 369/84; 346/76 L; 346/138
[58] Field of Search ............... 235/380, 436, 438, 454, 235/449, 474, 475, 479, 486, 487, 488; 365/234; 346/76 L, 138; 369/34, 36, 37, 39, 84, 179, 178, 192, 111; 360/2, 15, 87, 136, 100; 250/566–570

[56] References Cited

U.S. PATENT DOCUMENTS

| | | | |
|---|---|---|---|
| 3,512,130 | 5/1970 | Hulett | 235/380 |
| 3,654,624 | 4/1972 | Becker et al. | 365/234 |
| 3,949,191 | 4/1976 | Crowther et al. | 235/380 |
| 4,074,282 | 2/1978 | Balas et al. | 346/138 |
| 4,241,405 | 12/1980 | Allocca | 346/138 |
| 4,260,998 | 4/1981 | Fukui | 346/138 |
| 4,360,728 | 11/1982 | Drexler | 235/462 |
| 4,390,176 | 6/1983 | Kato | 346/138 |
| 4,578,717 | 3/1986 | Lemelson | 360/2 |
| 4,592,042 | 5/1986 | Lemelson et al. | 235/475 |
| 4,634,850 | 1/1987 | Pierce et al. | 235/487 |

Primary Examiner—Steven L. Stephan
Assistant Examiner—Robert A. Weinhardt
Attorney, Agent, or Firm—Thomas Schneck

[57] ABSTRACT

A data card recording system having a rotatable drum for supporting a plurality of data cards on its circumferential surface. A light source emits a beam which is modulated in response to data and directed to the cards on the rotating drum. The beam produces data spots in a plurality of parallel tracks aligned in the direction of drum rotation on a recording strip whose length is parallel to the drum axis. The focusing optics may be moved transversely to record in adjacent tracks. A data segment accessed from a data source and stored in a register of a microprocessor is recorded on a track on each card on the drum. A data control, controlling modulation rate, and a position detector unit are provided to synchronize the light beam modulation with the drum rotation rate. Drums and optical system embodiments are described for both reflectively and transmissively read data cards.

20 Claims, 4 Drawing Sheets

OPTICAL CARD DUPLICATING SYSTEM

CROSS REFERENCE TO RELATED APPLICATION

This is a continuation-in-part of application Ser. No. 937,648, filed December 2, 1986, now U.S. Pat. No. 4,820,913.

TECHNICAL FIELD

The present invention relates to optical data storage and in particular to systems for recording optical data on cards.

BACKGROUND ART

In U.S. Pat. No. 4,360,728, Drexler discloses a data card writing and reading system in which a laser light source emits a beam directed to a card. A first servo controlled mirror is mounted for rotation in order to find the lateral edges of laser recording material on the card in a coarse mode of operation and then in a fine mode of operation identify data paths which exist predetermined distances from the edges. A second servo controlled mirror is mounted for rotation in order to scan the beam in a fine mode of operation along the length of the card. Coarse control of the lengthwise position of the card is achieved by motion of a movable holder supporting the card. When recording, the beam produces light scattering or absorbing pits representing data bits in the laser recording material. The data are read by a photodetector detecting differences in reflectivity between a pit and surrounding material using a reduced power laser beam.

In U.S. Pat. No. 3,654,624, Becker et al. disclose a laser recording system in which a flat elongated record strip is wound around the surface of a drum. The drum is rotated with respect to the laser beam during recording and reproducing operations. By means of a servo-controlled linear positioning mechanism, the laser beam is moved transversely to the direction of drum rotation to permit selection of any one of a large number of spaced parallel scan lines on the record strip.

In an application of card duplicating, such as for on-demand publishing, there is a need to record from about ten to a few thousand data cards, all containing the same or similar information. A typical card writer/reader has a recording speed of about 10,000 data spots per second. Thus, it would require about 30 minutes to fill a single card with 2 megabytes of data. Although lasers are capable of generating pulses at a rate exceeding 200,000 per second, the overall recording speed is reduced by the continuous accelerations and decelerations involved in card motion relative to a fixed laser, or vie versa. The need to synchronize the laser beam pulses with the speed and position of the card also reduces the recording speed.

In prior application Ser. No. 937,648 a data card recording system was disclosed which records identical data on each of a plurality of data cards supported around the circumferential surface of a drum. The drum is mounted for rotation and may have flanges set in the circumference for gripping the longitudinal ends of the cards. Alternatively, the drum may comprise a pair of concentric cylinders in which the cards ar mounted between the cylinders. A light source emits a light beam which is directed along an optical path to the cards. The drum may be transmissive to the light beam or have openings or transmissive windows where the card is mounted on the inside rather than on the outside of the drum. The system also includes a data control circuit in communication with a data source and having at least one memory location for storing a data segment to be recorded onto the data cards. A modulator, such as an acoustic-optical modulator, may be electrically connected to the data control circuit and positioned in the optical path to modulate the light beam in response to the data segment. Alternatively, a semiconductor laser may be directly modulated by current control methods. Each of the cards has a strip of laser recordable optical data storage material disposed thereon, so that as the drum rotates, the modulated beam produces data spots corresponding to the stored data segment in one of a plurality of parallel tracks on each of the data cards on the drum.

Tracks of data are aligned in the direction of drum rotation. The relative transverse position between the beam and the cards is movable, as by moving an element in the beam path, so that additional data segments may be recorded in multiple parallel tracks on each of the cards. The data control circuit in communication with a drive control synchronizes the light beam modulation rate to the drum speed. Recording is complete when the data cards are each filled with identical information or when all data segments have been recorded. A photodetector may be positioned for reading a track on a card, measuring changes in optical contrast defined by data spots formed on the track and thereby verify that data recording is accurate. The same or another photodetector may provide autofocus control of the light beam. The same or still another photodetector may provide servo tracking of the light beam.

While the above system duplicated cards very rapidly, the cards produced were not suited to all applications, particularly high speed reading. An object of the invention was to devise a high speed data card recording system optimized for producing cards suited for high speed reading.

DISCLOSURE OF THE INVENTION

The above object has been met with a data card recording system which records identical data on each of a plurality of data cards supported around a circumference of a drum, thereby producing duplicate cards. Alternatively, the data on each card may be different or a combination of some being the same and some being different. The drum is mounted for rotation about an axis and the data cards have an elongated strip of optical recording material with the length of the elongate strip parallel to the axis of the drum.

In contrast to prior drum recording systems, wherein the recording medium had its lengthwise direction parallel to the direction of drum rotation, the present invention has its widthwise direction parallel to the direction of drum rotation. As the drum rotates, each card passing a laser writer, or the like, has the same or different data segment written until the drum makes one complete revolution, then the laser writer is translated with respect to the card and the next segment of data is written with identical or different data segments for each card. After completion of the next drum rotation, the process is repeated and so on, until all of the cards are completely written.

The advantage of recording the data in a widthwise, rather than a lengthwise, direction is that high-speed card readers are available which use CCD arrays to read across the width of a card as a card is advanced through a card handling machine which allows the card to pass beneath a CCD array disposed over the data strip. By disposing the optical recording strip parallel to the drum axis, existing, commercially-available data card readers may be used.

BEST MODE FOR CARRYING OUT THE INVENTION

Figure 1:
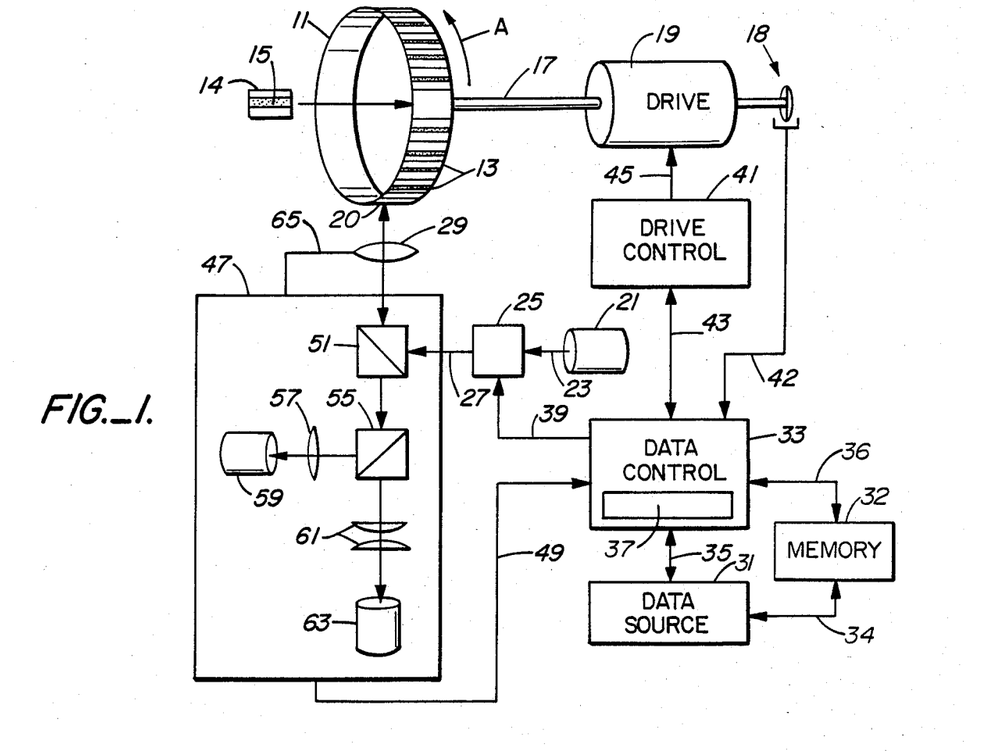
FIG. 1 is a schematic view of a data card recording system for reflective cards.
Figure 2:
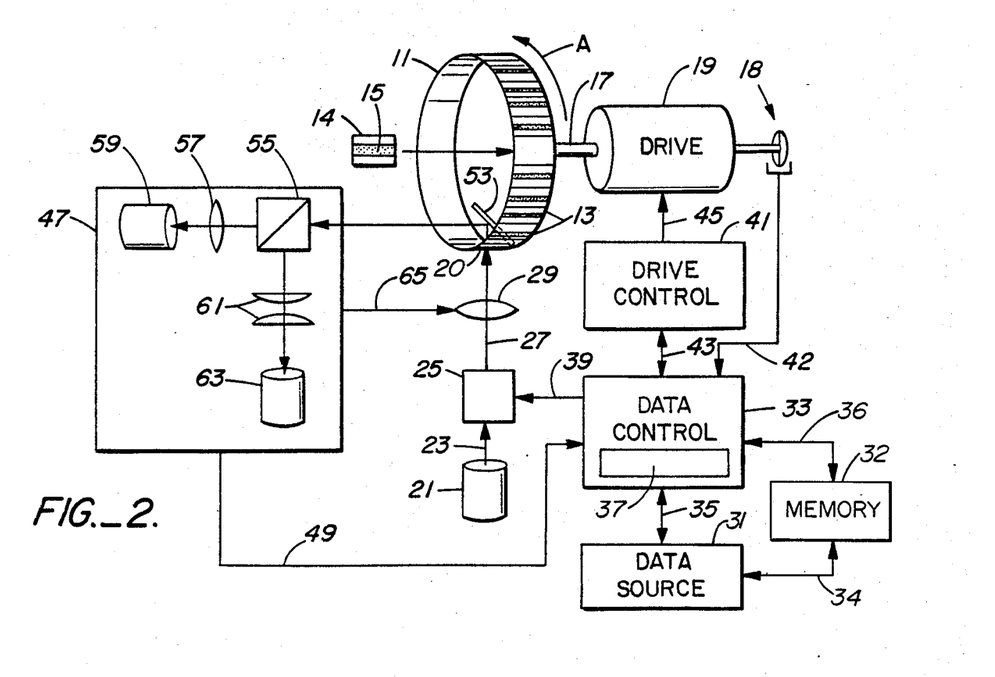
FIG. 2 is a schematic view of a data card recording system for transmissive cards.

With reference to FIGS. 1 and 2, a data card recording system includes a rotatable drum 11 supporting a plurality of data cards 13 bent around the drum circumferential surface. Each data card comprises a card base 14 and a strip 15 of laser recordable optical storage material disposed on base 14. Data cards are typically wallet sized with a width dimension of approximately 54 mm and length dimension of approximately 85 mm. These dimensions are not critical, but preferred because such a size easily fits into a wallet and has been adopted as a conventional size for automatic teller machines and the like. For cards of these dimensions, an 11 inch (27.9 cm) diameter drum is capable of supporting 16 cards, as shown in FIG. 1. Smaller drums, such as the drums in FIGS. 3–8 with a diameter of approximately 5 inches (12.7 cm), support as few as seven cards.

Card base 14 is a dielectric, usually a plastic material, such as polycarbonate, polyvinylchloride or similar material. Alternatively, card base 14 may be a metal film. Card base 14 may be either opaque or transparent. Card base 14 must be transparent when used with strips 15 which are transmissively read. Strip 15 is typically about 10 mm to 54 mm wide and extends the length of the card. The strip may be applied by any convenient method which achieves flatness and adherence to the card base. A transparent protective laminating sheet made of polycarbonate plastic or other material may cover strip 15 to protect it from dust and scratches.

The laser recordable optical data storage material which forms strip 15 may be one of the reflective recording materials which have been developed having direct-read-after-write capability. Typical recording media are described in U.S. Pat. Nos. 4,314,260, 4,278,758, 4,278,756, 4,298,684, 4,269,917 and 4,284,716, all assigned to the assignee of the present invention. These media contain suspensions of reflective metal particles in organic colloids and form highly reflective low melting temperature laser recordable media. Data are recorded by forming reduced reflectivity spots which contrast with the surrounding field of the reflective layer itself. Reflectivity of the strip field of about 50% with a reflectivity of a spot in the field of about 10% is preferred, thus creating a contrast ratio of approximately five to one, although a contrast ratio of two to one or even lower is sufficient for reading the data. Alternatively, media which have reflective spots in a low reflectivity field may be used. Media which are read by light transmission through the card may also be used. Erasable materials, such as magneto-optic and amorphous-to-crystalline recording materials, may also be used. Pre-recorded data may exist prior to recording as described below.

Drum 11 is rotatable about a drive shaft 17 on the drum cylindrical axis, as indicated by arrow A. A motor 19 to which drive shaft 17 is connected provides rotary power for turning drum 11. Typically, drum 11 rotates at a speed from about 100 to 1000 rpm. A position encoder 18 measures the speed of rotation and also indicates the completion of each drum rotation. A laser 21 emits a laser light beam 23 directed along an optical path to a card 20 mounted on drum 11. A modulator 25 positioned in the optical path modulates the light beam 23 in response to data. The resulting modulated beam 27 is focused onto an optical data storage strip 15 of a card on the drum 11 by means of focusing optics 29. Data are written where no previously recorded information has been written. For a semiconductor laser, current modulation may be used.

As the data cards 13 carried on surface of the rotating drum 11 move past the focused beam, data spots are recorded by the beam in one of a plurality of parallel tracks on the recording medium extending widthwise across each of the cards. The tracks are aligned in the direction of drum rotation along the width of the card. Additional tracks are recorded by moving the relative lateral position between the beam and the cards on the drum. This may be accomplished by moving the focusing optics 29 so as to move its optical axis laterally or change the orientation of its optic axis, thereby redirecting in either case the light beam's optical path slightly. Alternatively, a servo-controlled mirror, as described in U.S. Pat. No. 4,360,728, assigned to the assignee of the present invention, may be used. Also, the lateral position of drum 11 may be changed by altering the length of shaft 17 between drum 11 and motor 19 with a solenoid. Alternatively, a stepper motor may be used. The focusing beam should deliver sufficient laser pulse energy to the surface of the recording material to create spots. Typically, 10–40 milliwatts is required, depending on the recording material. A 40 milliwatt semiconductor laser, focused to a five micron beam size, records at temperatures of about 200° C. and is capable of creating spots in less than 5 microseconds. The wavelength of the laser 21 should be compatible with the recording material.

A data source 31 is connected to a data control circuit 33 via a data bus 35. Data source 31 may be semiconductor memory internal to the card writing system or may be an external peripheral device such as an optical card reader, disk drive or keyboard. When data source 31 is an optical card reader the entire system could be called a card duplicator. Data control circuit 33 is typically a microprocessor and includes at least one data register 37 for storing a data segment read from data source 31. Data control circuit 33 produces as output an electrical signal corresponding to the data segment stored in register 37 which is transmitted along a line 39 to modulator 25 so as to modulate laser light beam 23 in response to the data segment. The electrical signal output is produced as many times as there are data cards 13 on drum 11 for the same data segment so that each card records identical information. After a track of data has been recorded on each data card 13 on drum 11, data control circuit 33 produces an electrical signal output corresponding to another data segment for recording on an adjacent segment of data on each card. Preferably, data control circuit 33 has a second data register, similar to register 37, to read and store the next data segment while the signals for the current data segment are being output. Data control 33 receives via bus 42 a synchronizing signal from position encoder 18 after each drum revolution. Data control 33 may then send a signal via bus 49 to reposition the recording beam to the next track. Recording continues until all data in data source 31 are recorded or until data cards 13 are filled.

Figure 2A:
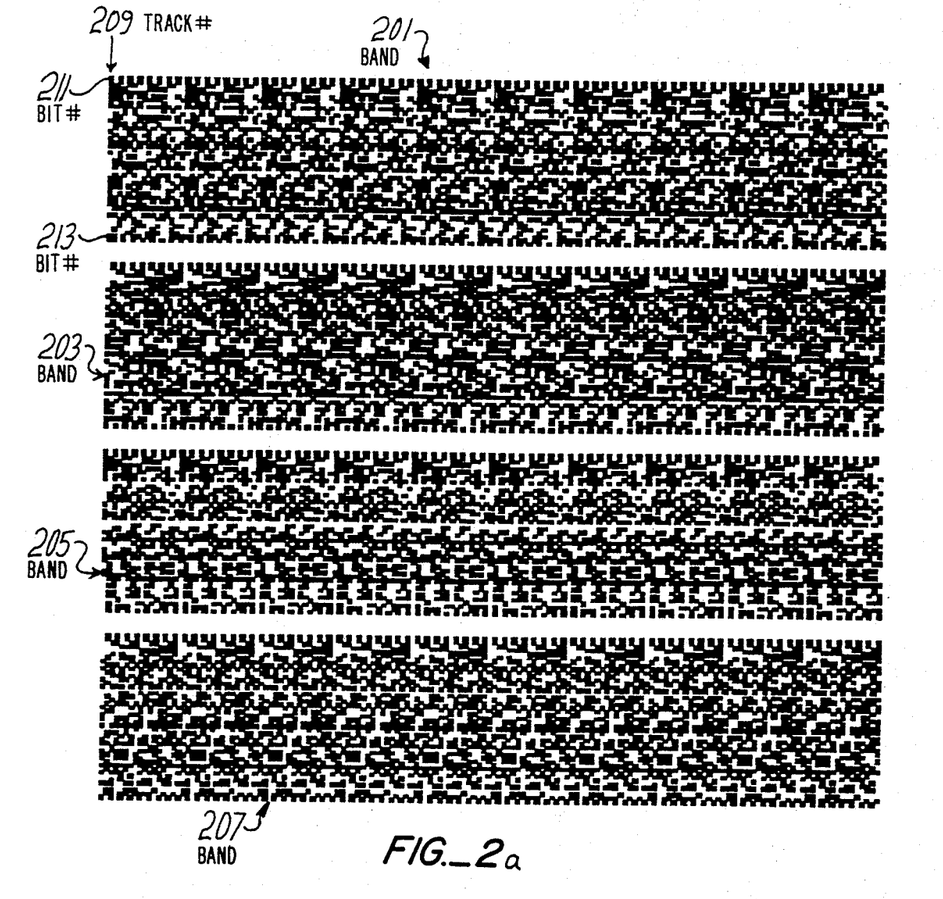
FIG. 2a is a diagrammatic view of data for recording on the cards of FIGS. 1 and 2.

FIG. 2a illustrates four parallel bands 201, 203, 205 and 207 of data for duplication onto a number of cards. Each band may be computer output data or any type of optically recorded digital data. In some duplicating systems, data is recorded and read in the same manner that alphanumeric data is typically read from a book. That is, the data in a band is read from left to right starting at the top of the band and progressing downwardly. In the present invention, however, the data is recorded in band 201 in a widthwise rather than a lengthwise direction. The data in band 201 is recorded in columns, with the first column, or "track" 209, having a first bit 211 at the upper left corner and a fifty-second bit 213 recorded in a lower left corner, as viewed in FIG. 2a. The following bits in the sequence of data bits comprising band 201 are arranged in the track adjacent track 209, the fifty-third bit being at the top of the track and the one-hundred-and-fourth bit being found at the bottom, adjacent bit 213. A wallet size card may have 3,500 tracks. In the duplication process described with reference to FIGS. 1 and 2, the tracks are recorded one at a time and the bits are recorded sequentially.

A problem arises in widthwise recordations when more than one band must be duplicated. Many times a data card will carry multiple parallel bands. A single band, such as band 201, having 3,500 tracks of fifty-two bits may be recorded in a manner that permits recordation of all 182,000 bits in sequence. The multiple band arrangement shown in FIG. 2a, however, cannot be duplicated in a bit-sequential order if duplication speed is to be maximized. The second band 203 contains 182,000 bits which follow the bits of the first band 201. Likewise, the third and fourth bands 205 and 207 are each comprised of data bits which sequentially follow the data bits contained in the preceding band.

Rather than duplicating the bands 201–207 in a singular fashion, the data source 31 shown in FIGS. 1 and 2 reads all bands from the entire card into memory 32 via bus 34 and rearranges the data into a bit-mapped image file. A data segment which is then read by the data register 37 of the data control circuit 33 via bus 36 will include corresponding tracks from each of the bands 201–207. For example, a first data segment contains bits 1–52 from band 201, bits 182,001–182,052 from band 203, bits 364,001–364,052 from band 205, and bits 546,001–546,052 from band 207. After the first data segment has been recorded in a single pass on each card, a second data segment is read from the bit-map by the data control circuit. The second data segment consists of each second track of each band 201–207 and is written on the next pass or drum revolution. Each data segment is successively read from the bit-map in the data source and is successively recorded onto a plurality of cards until each card carries a duplication of the master shown in FIG. 2a.

Returning to FIGS. 1 and 2, data control circuit 33 also communicates with a drive control or servo 41 via a bus 43. Drive control 41 sends electrical signals along a line 45 to motor 19 to cause motor 19 to start, stop, speed up or slow down. Together data control circuit 33 and drive control 41 synchronize the light beam modulation with the rotary speed of the drum. Alternatively, the rotation speed is sensed using position encoder 18. This signal is used by data control 33 to synchronize the modulation rate of modulator 25 with the rotation speed of drum 11.

A detector unit 47 may be disposed in reading relation relative to a track for providing feedback to data control circuit 33 and drive control 41. Detector unit 47 communicates with these control elements 33 and 41 via an electric signal line 49. In FIG. 1, data cards 13 are read by reflection, so that detector unit 47 is positioned in a light reflective relation relative to cards 13 on drum 11. A beamsplitter 51 may be used to direct modulated beam 27 to cards 13 and to direct reflected light from cards 13 to one or more detectors 59 and 63. In FIG. 2, data cards 13 are read by light transmission, so that detector unit 47 is positioned in a light transmissive relation relative to cards 13. A mirror 53 inside drum 11 may be used to direct transmitted light from cards 13 to one or more detectors 59 and 63.

In the two-detector unit 77 shown in FIGS. 1 and 2, a second beamsplitter 55 directs a portion of the light from cards 13 through a focusing lens 57 onto a reading detector 59, and a second portion through a lens doublet 61 onto an autofocus detector 63. Typically 50% of the light is directed to reading detector 59 and 50% of the light is directed to autofocus detector 63. Other detector arrangements may also be used. For example, a single detector, such as detector 59 may be used. In the detector arrangement shown, autofocus detector 63 communicates with focusing optics 29 via bus 65 to effect a change in either the focal length of focusing optics 29 or the distance between focusing optics 29 and a card 13 on drum 11, thereby bringing the modulated beam 27 into a sharp focus onto card 13. Reading detector 59 reads data as or just after data are written by sensing changes in optical contrast defined by data spots formed on a track of the card so as to verify proper data recording. Detector 59 may also be used to read prerecorded clocking marks, beginning and end of track marks and other track codes to aid in the synchronization of data writing. Prerecorded marks may not be necessary in precision high speed recorders.

In the case of a precision high speed recorder it is desirable that the recording beam move smoothly in the absence of track guides rather than in steps. In this case the beam can be moved in a uniform manner in a helical scan by means of a precision screw. So that the laser recorded data are parallel to the card edge, it is preferable that the card be mounted in a skew fashion and each card be offset from the next. The degree of skew and offset would be determined by the data track pitch.

Figure 3:
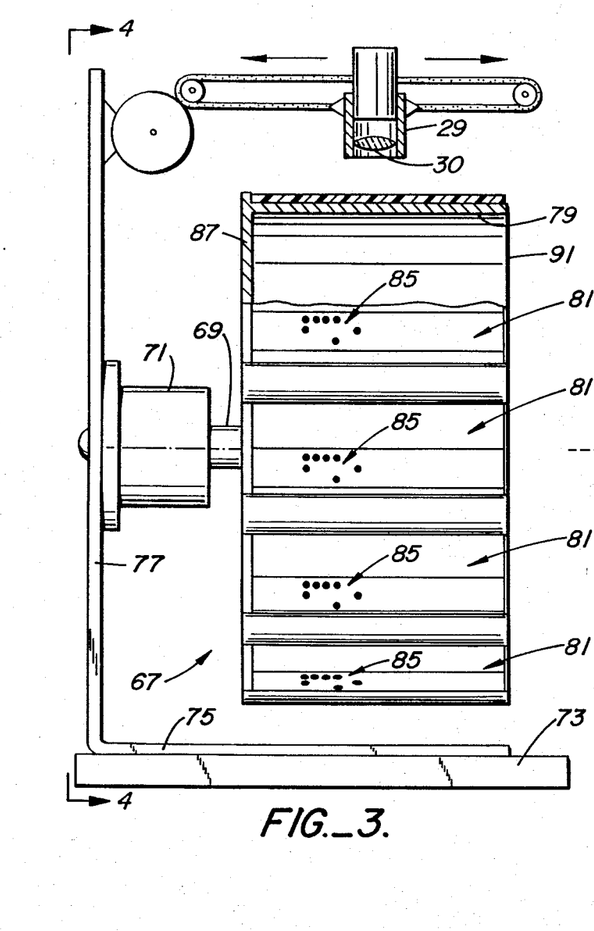
FIG. 3 is a side plan of a first embodiment of a drum for the systems in FIGS. 1 and 2.
Figure 4:
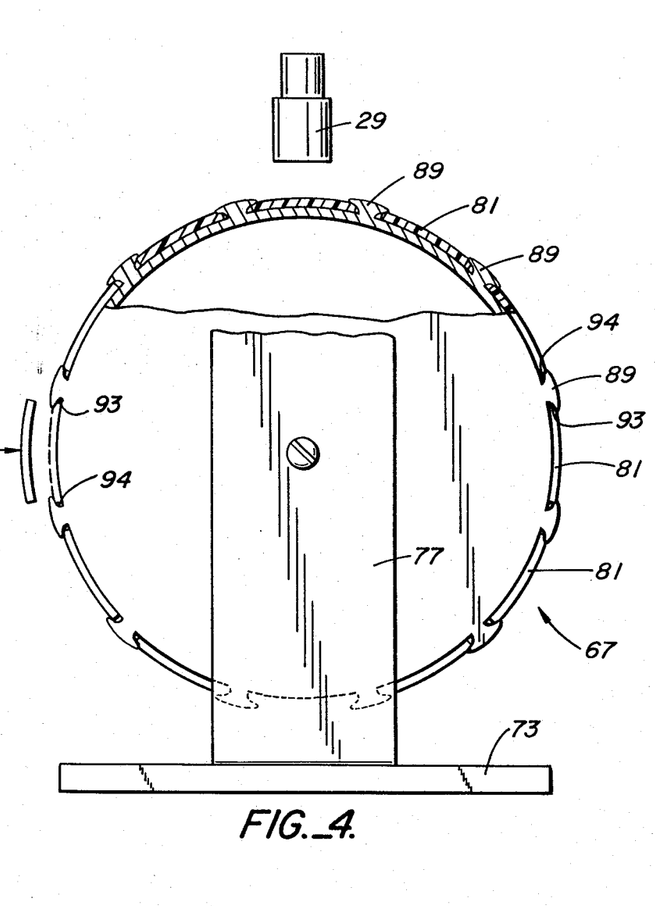
FIG. 4 is an end view taken along the lines 4—4 in FIG. 3.

With reference to FIGS. 3 and 4, a drum 67 is rotatably mounted on a shaft 69 and driven by a motor 71. The drum may be mounted or rotation about either a horizontal or vertical axis. A base 73 supports a frame 75 which has an upright arm 77 to which motor 71 is mounted. The drum depicted has a circumferential surface 79 sufficiently large to accommodate a number of wallet size data cards 81. As noted above, larger drums which can accommodate a greater number of data cards may also be used and are similarly constructed. Focusing optics 29 having at least one lens 30 are located outside of drum 79 for focusing a modulated light beam for writing data spots 85 onto cards 81. Focusing optics 99 may also direct reflected light from cards 81 to a detector unit 47, shown in FIG. 1. Servo track guides may be provided on cards 81 for feedback and motor control in reading and writing the spots 85 in tracks between the track guides. Track guides may be aligned in the direction of travel of the rotating drum. Servo track guides may not be necessary in precision high speed recorders. Alternatively, track guides and other indicia may be written with the laser as the data are being written on cards which have no prerecorded indicia.

Drum 67 comprises a circumferential surface or cylinder 79 and a circular side wall 87 connected to one edge of cylinder 79. A plurality of transverse flanges 89 are spaced around the circumference of the drum for support and retention of the data cards. Motor shaft 69 may be directly mounted to side wall 87, as shown in FIG. 3, or alternatively may be offset and the drum driven by means of a connecting pulley and drive shaft mounted to either side wall 87 or a disk in rim 91 opposite from side wall 87. Data cards are fastened to the outer circumferential surface 79 of the drum by means of grooves 93 and 94 in the sides of transverse flanges 89. The data cards 81 are somewhat flexible and may be bent, as shown in FIG. 4, so as to slide into grooves 93 and 94 of flanges 89.

Figure 5:
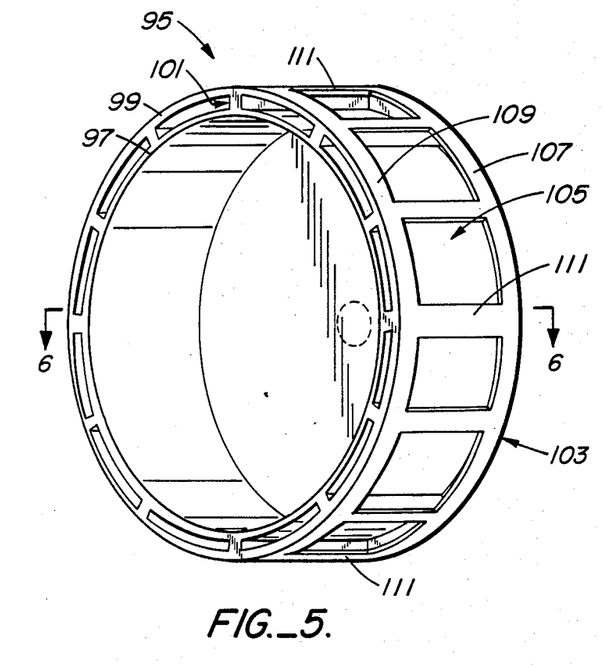
FIG. 5 is a perspective view of a second embodiment of a drum for the systems in FIGS. 1 and 2.
Figure 6:
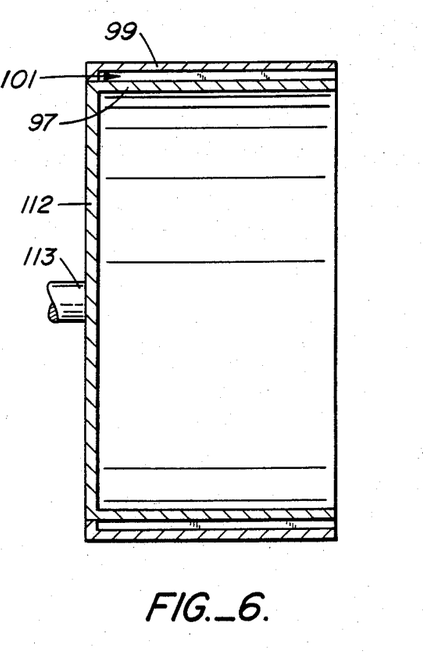
FIG. 6 is a side sectional view of the drum of FIG. 5 taken along the lines 6—6 in FIG. 5.

In FIGS. 5 and 6, an alternate embodiment of a drum 95 comprises two concentric cylinders 97 and 99 having a card retention slot 101 between the two cylinders 97 and 99. A plurality of data cards may be mounted in slots 101. The outer cylinder 99 is transmissive to the modulated laser light beam used for recording on the cards and may either be formed of transmissive plastic or comprise a metal frame structure 103 with light transmissive windows 105. The windows 105 may either consist of open areas in the frame 103 or be formed of transmissive plastic, glass or other material set in the frame. Likewise, the inner cylinder 97 may be formed of transmissive material or comprise a frame with transmissive windows. The inner cylinder need not be transmissive to the recording light beam when using reflectively read data cards, and may be formed from a solid opaque material, such as metal. When used to support transmissively read cards in the configuration shown in FIG. 2, both the outer and inner cylinders must be transmissive.

Frame 103 of outer cylinder 99 has a pair of rings 107 and 109 joined by means of struts 111. Struts 111 may extend inward to inner cylinder 97 thereby providing transverse barriers in slot 101 to keep cards from slipping. A solid base 112 is attached to ring 107 and inner cylinder 97 providing means for mounting motor shaft 113. Slot 101 is open at one edge, opposite from base 112, allowing access into slot 101 for the data cards.

Figure 7:
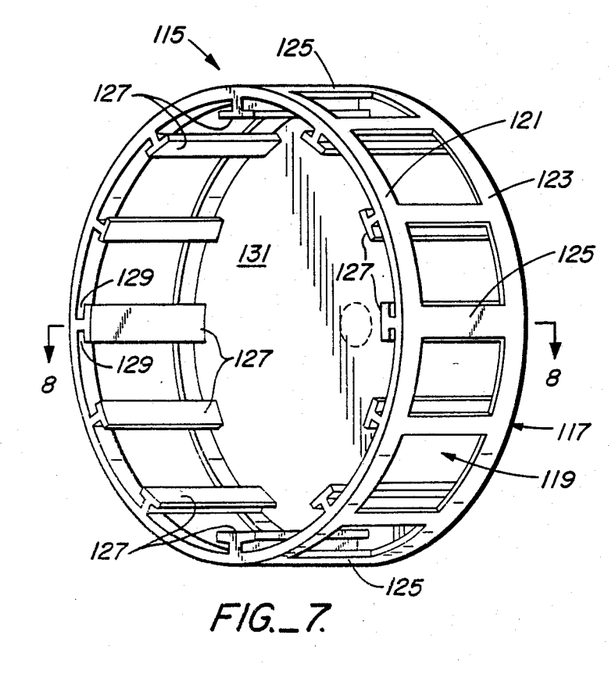
FIG. 7 is a perspective view of third embodiment of a drum for the systems in FIGS. 1 and 2.
Figure 8:
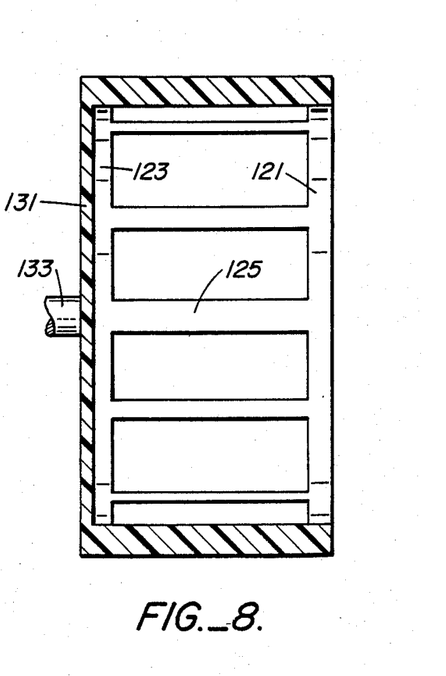
FIG. 8 is a side sectional view of the drum of FIG. 7 taken along the lines 8—8 in FIG. 7.

In a third embodiment, shown in FIGS. 7 and 8, a drum 115 comprises a frame 117 having windows 119. Windows 119 may be open areas, as shown, or alternatively, be formed of transmissive material, such as glass or plastic. Frame 117 has a pair of rings 121 and 123 joined by struts 125. Each strut has flanges 127 attached on the inside surface thereto, with grooves 129 in the flanges 127 for retaining data cards. A solid base 131 is attached to one of the rings for mounting a motor shaft 133 to the drum.

Figure 9:
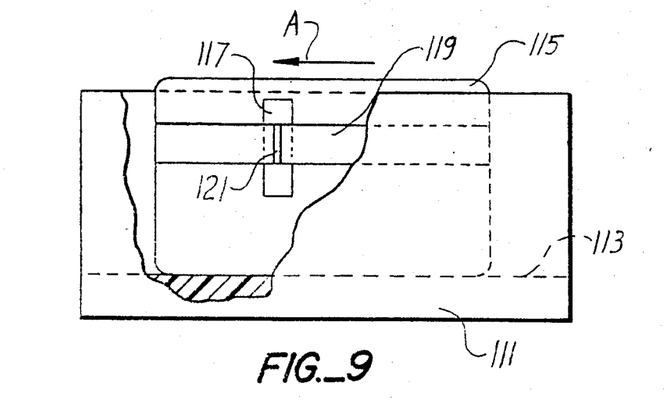
FIG. 9 is a plan view of a high speed optical card reader for use with cards made using the systems shown in FIGS. 1 and 2.

In FIG. 9, an optical card reader is shown of a type described in U.S. Pat. No. 4,634,850 and commercially available from Nippon Coinco Co. of Japan. This reader may form the data source 31 in the systems of FIGS. 1 and 2, add has a master data card 115 disposed in reading relation thereto. The card 115 is usually received in a card transport 111 which includes a rail 113 which supports the card. The transport 111 includes a read-out head 117 mounted for scanning data strip 119 carried by card 115.

The read-out head 117 holds a linear CCD array 121. The linear array has a line of detectors which laterally spans at least one row of data on strip 119 at a time. As the card is moved in the direction shown by the arrow A, by an automatic cad advancing mechanism, strip 119 moves past the read-out head 117 so that the strip 119 passes beneath the linear detector array 121. This allows microscopic data spots on the strip to pass beneath the read-out head 117.

Figure 10:
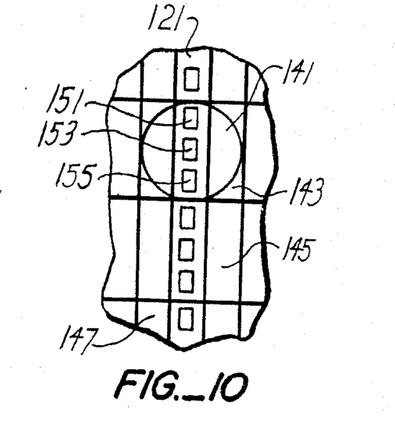
FIG. 10 is a detail of detector cells in the card reader of FIG. 9 aligned for reading data spots.

FIG. 10 shows a linear detector array 121 passing over a portion of a grid having the data spot 141 within data cell 143. Data cells 145 and 147 are in same row, but empty, as well as are the other data cells which are pictured.

The linear detector array 121 has a plurality of detectors 151, 153, 155 disposed for sensing light reflected from each cell. In this case, three detectors observe cell 143 and in the process detect spot 141. Since the detectors are CCD devices, the detector output is sensed by shifting charge levels from one end of the linear array to the other. The charge levels are measured in terms of voltage, with a high amount of reflectivity defined as the highest or lowest voltage condition and the lowest amount of reflectivity defined as the opposite voltage condition. A threshold level is defined between the maxima and the output from the number of detectors observing one cell can be polled to determine whether or not a spot existed within a cell. For example, if two of three detectors have voltage levels indicative of a spot, then presence of the spot is assigned to that particular cell. However, if only one detector cell indicates a spot, the cell is determined to be empty and the single detector reporting a spot is believed to have detected foreign material within the cell. The detector array 121 produces electrical signals which, upon interpretation, correspond to spots. These signals may be sent along bus 35 to data control 33 in FIGS. 1 and 2 for storage of a data segment corresponding to a track of data. Track after track is written until the entire card is written. If the card has more than one band of data, however, the entire card is read into memory 32 and converted to an arrayed bit-map prior to the reading of data segments across the width of the card.

Using any of the drums described in FIGS. 3-8 with systems in FIGS. 1 and 2, one can obtain a high speed data card recording system useful for card duplication, such as in on-demand publishing. The system is capable of recording several data cards at once with the same or different data, at an average speed of two minutes per card. Instead of taking three weeks to record one thousand cards, the job an be completed in less than a day and a half. The use of rotating drum not only enable multicard recording, but also simplifies synchronization of card position with data compared to prior reciprocating systems, resulting in fewer recording errors.

What is claimed:

1. A data recording system for data cards that is suitable for high speed reading, the system comprising,
   a plurality of data cards, each data card having a length and a width and having an elongated strip of laser recordable, optical data storage material positioned thereon, with the strip length being parallel to the length of the data card and each strip having a plurality of data tracks thereon aligned parallel to the width of the card,
   a drum rotatable about a drum axis and having a circumference with support means for supporting the data cards thereon so that the lengths of the cards are parallel to the drum axis, with the support means comprising fixed flanges set in the drum circumference and being aligned transverse to the direction of the drum rotation so that two ends of each of the plurality of data cards are retained between the fixed flanges and the surface of the drum circumference, and
   light beam means for writing a data segment in one of the plurality of data tracks on each strip of data storage material in sequence, one strip after another.

2. The system of claim 1 wherein said plurality of data cards are supported around the outside of said drum circumference surface.

3. A data recording system for data cards that is suited for high speed reading, the system comprising,
   a drum having a drum circumference and being mounted for rotation about a drum axis, the drum having support means for supporting a plurality of data cards around the surface of the drum circumference, each data card having a length and a width and having an elongated strip of laser recordable, optical data storage material positioned thereon, with the strip length being parallel to the length of the data card and each strip having a plurality of data tracks thereon aligned parallel to the width of the card, with the data cards being mounted on the drum with the length of each card parallel to the drum axis, and with the support means comprising fixed flanges set in the drum circumference and being aligned transverse to the direction of drum rotation so that two ends of each of the plurality of data cards are retained between the fixed flanges and the surface of the drum circumference,
   a data source,
   storage means in communication with the data source, for storing a plurality of data segments in the data source,
   a light source that emits a light beam directed along an optical path toward the plurality of data cards,
   modulation means in communication with the data source, for receiving information stored on a data segment and, in response thereto, for modulating the light beam along one of the plurality of data tracks on each of the strips of data storage material, in sequence, one card after another, and
   movement means for moving the light beam transversely between the plurality of strips of data storage material so that information from another data segment is recorded on another data track on each of the strips.

4. The system of claim 3 wherein said plurality of data cards are supported around the outside of said drum circumferential surface.

5. The system of claim 3 wherein said plurality of data cards are supported against the inside of said drum circumferential surface, said drum forming a plurality of windows, each of said windows defining an open area and corresponding to a data card position.

6. The system of claim 3 wherein said drum comprises two concentric cylinders and said plurality of data cards are mounted between said cylinders, at least the outer one of said cylinders forming a plurality of windows, each of said windows defining an open area and corresponding to a data card position.

7. The system of claim 3 wherein said drum comprises a pair of spaced apart circular frame members and a plurality of bars therebetween connecting said pair of frame members together, said frame members and said plurality of bars defining open areas open between said frame members and said bars.

8. The system of claim 3, further comprising detector means disposed in reading relation relative to one of said data tracks, for sensing changes in optical contrast defined by data spots formed on said data track.

9. The system of claim 8 wherein said light source and said detector means are in light reflection relation relative to said drum and said data cards.

10. The system of claim 8 wherein said light source and said detector means are in light transmission relation relative to said drum and said data cards, each of said data spots being read by said detector means by sensing light transmission contrast between said data spots and a non-data spot area.

11. A data recording system comprising,
    a drum mounted for rotation about an axis, the drum having means for gripping a plurality of data cards around the drum circumferential surface, each of said plurality of data cards having a length and a width, with an elongated strip of laser recordable optical data storage material disposed thereon parallel to the length of the card, the cards mounted on the drum with said elongated strip of laser recording material parallel to the axis of the drum,
    a data source having means for forming a bit-map data image and decomposing the image in a series of data segments, a side-by-side arrangement of said data segments forming elongated parallel bands of data, each band of data having said data segments transverse to the length of said bands, said bands readable one after the other,
    a light source emitting a light beam, said beam being directed along an optical path to said plurality of data cards,
    means for modulating said light beam in accord with data segment data, said beam producing data spots corresponding to said data segment data in a plurality of tracks on each of said data cards, one card after another, said tracks being aligned parallel to the width of the card, each track on a data card forming a portion of one of said bands of data, and
    means for moving the relative transverse position between said beam and said plurality of data cards, additional data segments being recorded in side-byside relation on each of said data cards to form bands of data corresponding to said bit-map.

12. The system of claim 11 wherein said gripping means comprises flanges set in the circumference of the drum and aligned transverse to the direction of drum rotation, whereby longitudinal ends of said plurality of data cards are retained by pressure of said flanges.

13. The system of claim 12 wherein said plurality of data cards are supported around the outside of said drum circumferential surface.

14. The system of claim 11 further comprising detector means disposed in reading relation relative to a track for sensing changes in optical contrast defined by data spots formed on said track.

15. The system of claim 14 wherein said light source and said detector means are in light reflection relation relative to said drum and said data cards.

16. The system of claim 15 wherein said light source and said detector means are in light transmission relation relative to said drum and said data cards.

17. The system of claim 12 wherein said plurality of data cards are supported against the inside of said drum circumferential surface, said drum being transmissive of said light beam.

18. The system of claim 11 wherein said drum comprises two concentric cylinders and said plurality of data cards are mounted between said cylinders, at least the outer one of said cylinders being transmissive of said light beam.

19. The system of claim 11 wherein said drum comprises a pair of spaced apart circular frame members and a plurality of bars therebetween connecting said pair of frame members together.

20. The system of claim 19 wherein windows transmissive of said light beam are provided between said bars.

* * * * *

UNITED STATES PATENT AND TRADEMARK OFFICE
CERTIFICATE OF CORRECTION

PATENT NO. : 4,912,312

DATED : March 27, 1990

INVENTOR(S) : Richard Haddock

It is certified that error appears in the above-identified patent and that said Letters Patent is hereby corrected as shown below:

Column 1, line 54, "vie versa" should read -- vice versa --.

Column 6, line 38, "two-detector unit 77" should read
  -- two-detector unit 47 --.

Column 7, line 5, "mounted or rotation" should read
  -- mounted for rotation --.

Column 7, lines 15 and 16, "Focusing optics 99" should read
  -- Focusing optics 29 --.

Column 8, line 17, "add has" should read -- and has --.

Column 8, line 27, "cad advancing mechanism" should read
  -- card advancing mechanism --.

Claim 2, column 9, lines 35-36, "of said drum circumference surface." should read -- of said drum circumference. --.

Signed and Sealed this

Fourth Day of June, 1991

Attest:

HARRY F. MANBECK, JR.

Attesting Officer

Commissioner of Patents and Trademarks